Patented Mar. 22, 1927.

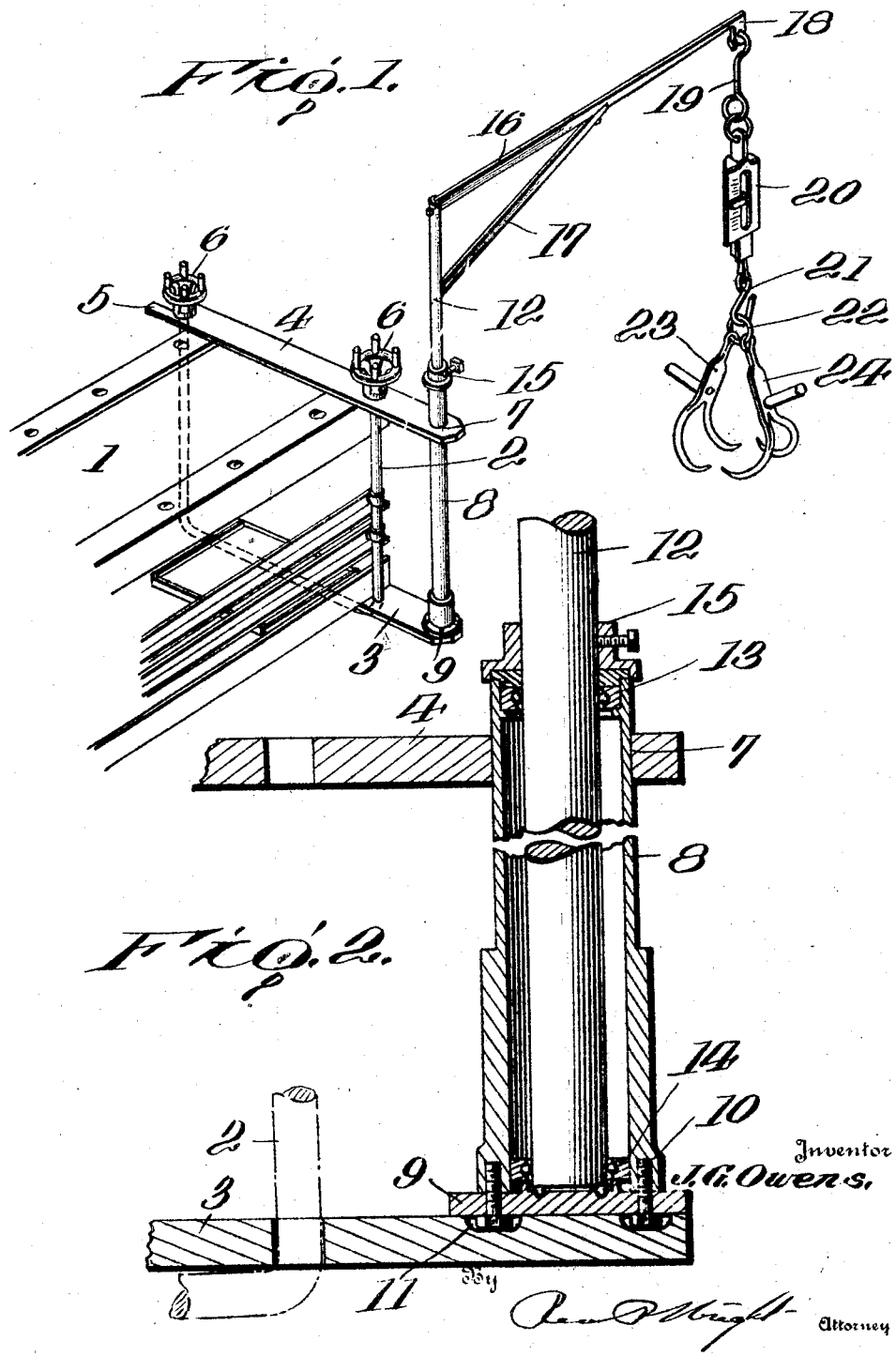

1,621,807

UNITED STATES PATENT OFFICE.

JOHN GARY OWENS, OF BARNWELL, SOUTH CAROLINA, ASSIGNOR OF ONE-FOURTH TO R. C. HOLMAN, OF BARNWELL, SOUTH CAROLINA, AND ONE-FOURTH TO JOHN I. RICE, OF COLUMBIA, SOUTH CAROLINA.

HAY REMOVER AND WEIGHER FOR HAY PRESSES.

Application filed February 4, 1924. Serial No. 690,426.

This invention relates to certain new and useful improvements in a bale remover and weigher for hay presses, the object being to provide a device which can be readily attached to any of the well known constructions of hay presses now in use for removing the bale from the bale chamber and weighing the same in order to allow the bale to be swung to one side of the press.
Another object of my invention is to provide a device which is composed of a crane carrying a scale having a grappler connected thereto whereby the bale can be handled by one man, thereby saving the expense in removing the bale from the press as it leaves the bale chamber.

Another and still further object of the invention is to provide a device which is exceedingly simple and cheap in construction and one which is composed of few parts, which are so mounted on the press that they can be readily attached or detached, the bale hooks being specially constructed to grip the bale so that the bale can be swung to one side out of the way of the next bale leaving the bale chamber and at the same time weighed.

Other and further objects and advantages of the invention will be hereinafter set forth and the novel features thereof defined by the appended claims.

In the drawings,

Figure 1 is a perspective view of a portion of a hay press showing the application of my improved construction of bale remover and weigher; and Figure 2 is a detail vertical section through a portion of the cross bars, support and mast.

In the drawing 1 indicates a bale chamber of an ordinary hay press, the end of which is secured together in the ordinary practice by U-shaped yoke 2, the vertical legs of which are connected by a cross bar. In carrying out my invention, this cross bar is removed and my improved construction of device is attached by the U-shaped yoke as will be hereinafter fully described, the above description being given so that the application of my invention to the ordinary construction of hay press can be clearly understood.

In carrying out my invention I arrange above and below the bale chamber at its end cross bars 3 and 4 which are provided with bifurcated ends 5 through which one of the vertical legs of the yoke 2 are adapted to pass at one side of the bale chamber as clearly shown.

The bars 3 and 4 are provided with openings in vertical alignment with one another through which the other leg of the yoke 2 is adapted to pass, the ends of the legs being threaded on which are mounted nuts 6 for clamping the bars 3 and 4 in position on the bale chamber, which allows the bars to be readily attached or detached from the bale chamber.

The ends of the bars extend outwardly to one side of the bale chamber and the upper bar is provided with an opening 7 through which extends a tubular support 8, the lower end of which is mounted on a base 9 secured thereto by bolts 10, the heads of which are seated in recesses 11 formed in the lower bar 3 so as to prevent the tubular support from revolving. By having the bars bifurcated at one end the same can be adjusted to different width bale chambers.

Revolubly mounted within the tubular support 8 is a mast 12 on top and bottom bearings 13 and 14, these bearings being preferably ball bearings constructed so as to support the mast vertically within the tubular support so that it will revolve freely, the top of the tubular support being closed by a cap 15.

Secured to the upper end of the mast 1 is a boom 16 provided with a brace 17, said boom having a depending apertured end 18 in which is arranged a link 19 carrying the spring scale 20, in the hook 21 of which is arranged a ring 22 on which are mounted hooks 23 and 24 forming a grappler adapted to grab the bale, said hooks being provided with handles for facilitating the operation of the same.

The mast on the boom forms a crane which can be swung in its support so that the hay hooks can be swung around in position to engage the bale of hay by simply swinging the crane. The bale of hay will be swung to one side out of the way of the next bale leaving the bale chamber and at the same time the bale can be weighed.

I have found in practice that by the use of such a device a great labor saving device is produced, as the bales can be handled by a single man as they leave the bale chamber when in practice it requires three men to handle the bales as they leave the press and the main object of my invention is to provide a device by means of which the bales can be shifted as they leave the bale press and weighed simultaneously.

While I have shown certain details of construction, I do not wish to limit myself to these details as I am aware that various changes can be made without departing from the spirit of my invention, which consists in providing a novel means for attaching the bale remover and weigher to a hay press without changing the construction in any way.

What I claim is:—

1. The combination with the bale chamber of a hay press, of a pair of bars arranged above and below said chamber, a U-shaped yoke embracing said chamber for securing said bars in position on said chamber, a tubular support mounted in said bars, a mast revolubly mounted in said support, a crane carried by said mast and a weighing scale carried by said crane having hay hooks for engaging the bale of hay.

2. The combination with a hay press, of a pair of bars secured to the bale chamber of the press and extending out to one side thereof, a tubular support carried by said bars provided with ball bearings, a mast mounted in said bearings within said support, a boom carried by said mast, a pair of scales carried by said boom and a pair of hooks carried by said scales.

3. A bale remover and weigher for hay presses comprising a pair of bars adapted to be secured to the bale chamber of the press, a tubular support carried by said bars provided with bearings, a mast mounted in said bearings, a boom carried by said mast, a pair of scales carried by said boom and a pair of hay hooks carried by said scales.

In testimony whereof I hereunto affix my signature.

JOHN GARY OWENS.